United States Patent
Green et al.

(10) Patent No.: US 7,394,651 B2
(45) Date of Patent: Jul. 1, 2008

(54) COMPUTER PERIPHERAL DEVICE MOUNTING ARRANGEMENT WITH TWO LOCKING ELEMENTS

(75) Inventors: Douglas A. Green, Anaheim Hills, CA (US); Scott L. Hanson, Mission Viejo, CA (US); Mark R. Thompson, Huntington Beach, CA (US)

(73) Assignee: Quantum Corporation, San Jose, CA (US)

( * ) Notice: Subject to any disclaimer, the term of this patent is extended or adjusted under 35 U.S.C. 154(b) by 213 days.

(21) Appl. No.: 11/316,049

(22) Filed: Dec. 21, 2005

(65) Prior Publication Data

US 2006/0158860 A1    Jul. 20, 2006

(51) Int. Cl.
*H05K 5/00*    (2006.01)
(52) U.S. Cl. ........................................ 361/685; 361/679
(58) Field of Classification Search ................. 361/685, 361/679
See application file for complete search history.

(56) References Cited

U.S. PATENT DOCUMENTS

| | | | |
|---|---|---|---|
| 5,510,955 A * | 4/1996 | Taesang ...................... | 361/685 |
| 6,069,789 A * | 5/2000 | Jung .......................... | 361/684 |
| 6,377,446 B1 * | 4/2002 | Liau .......................... | 361/683 |
| 6,496,363 B1 * | 12/2002 | Li ............................. | 361/685 |
| 6,657,868 B1 * | 12/2003 | Hsue .......................... | 361/728 |
| 6,924,976 B2 * | 8/2005 | Wang et al. ................. | 361/685 |

FOREIGN PATENT DOCUMENTS

JP    06125184    *   6/1994

* cited by examiner

*Primary Examiner*—Jayprakash N Gandhi
*Assistant Examiner*—Zachary M Pape
(74) *Attorney, Agent, or Firm*—Baker Botts L.L.P.

(57) ABSTRACT

A computer peripheral device mounting arrangement has a pair of computer peripheral device mounts. Each computer peripheral device mount includes a computer peripheral device side bracket that is mounted on an exterior sidewall of the computer peripheral device. Each computer peripheral device mount also includes a drive bay bracket fixedly positioned in a drive bay. Clips and slots provide a non-locking securement arrangement on the computer peripheral device side bracket and the drive bay bracket. The computer peripheral device side bracket and the drive bay bracket of each computer peripheral device mount is secured by a single screw that prevents relative movement between the computer peripheral device side bracket and the drive bay bracket.

18 Claims, 4 Drawing Sheets

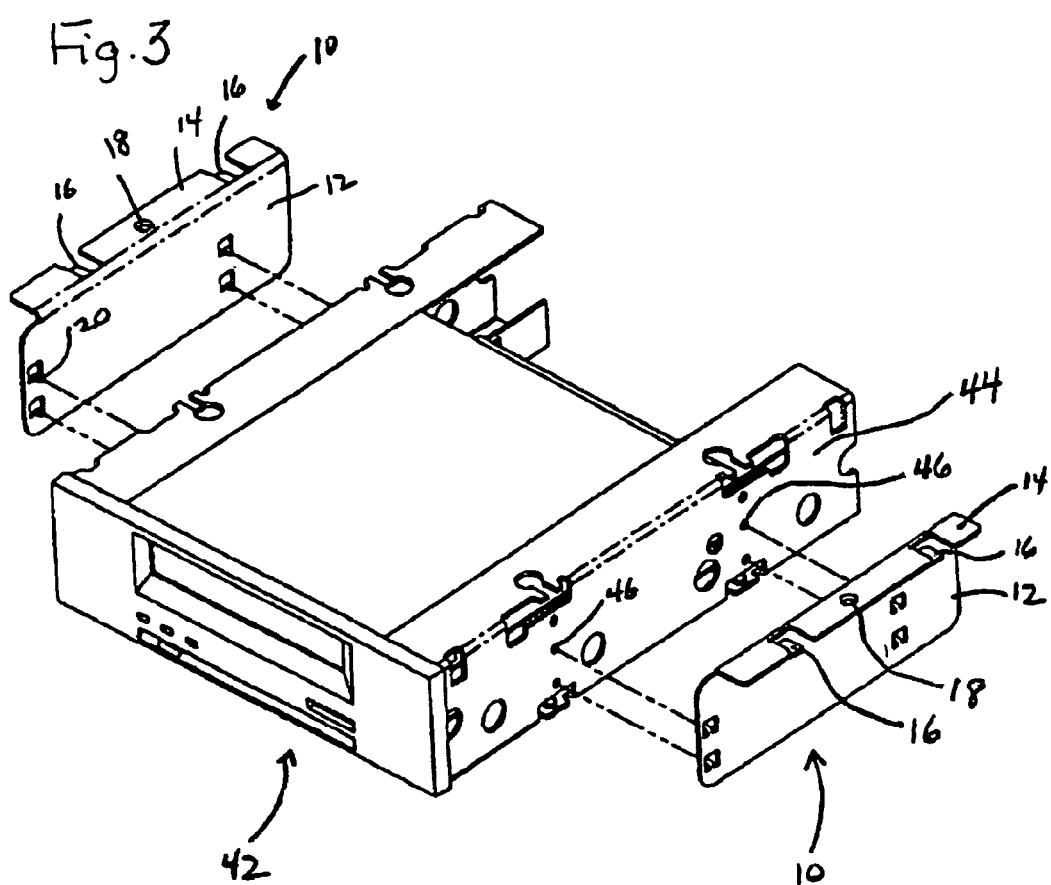

COMPUTER PERIPHERAL DEVICE MOUNTING ARRANGEMENT WITH TWO LOCKING ELEMENTS

RELATED APPLICATIONS

This application claims priority to U.S. patent application Ser. No. 10/849,054 filed on May 20, 2004 which in turn claims priority to U.S. Provisional Application Ser. No. 60/483,568, filed on Jun. 26, 2003, both of which are incorporated herein by reference.

FIELD OF THE INVENTION

The present invention relates to the field of computer peripheral devices, and more particularly, to the mounting of computer peripheral devices within a drive bay.

BACKGROUND OF THE INVENTION

The mounting of computer peripherals, such as computer peripheral devices, into a rack mount enclosure or other structure, typically poses a number of challenges. For example, a typical mounting configuration requires the use of four to six screws. A four screw mounting solution in a typical mounting configuration creates problems in that the screws can only be accessed from the sides of the computer peripheral device and requires special tooling and/or processes. The special tooling and/or processes are not only costly but can be prohibitive in field repair of the unit. Another problem with the four screw mounting arrangement is that it does not provide enough support to meet shock and vibration requirements of many computer peripheral devices, such as typical tape drives.

Increasing the number of screws to six screws resolves many of these concerns but adds increased costs due to the additional tooling and hardware required. Hence, in practice, a six screw mounting solution is not desirable.

In addition to meeting computer peripheral device shock and vibration requirements, a successful mounting arrangement should allow a computer peripheral device to mount from the top and/or the front of the drive bay, and require very minimal disassembly other than removing a top cover to install or swap devices. Additionally, the mounting arrangement should be compatible with a standard 5.25 inch half high device, or adaptable for use in other configurations, such as 5.25 inch full-high, 3.5 inch full-high and half-high devices. Further design considerations are ready manufacturability and low cost of the mounting arrangement. Easy assembly is a design concern, as well as reducing the number of screws to avoid costs created by added tooling and additional hardware.

SUMMARY OF THE INVENTION

There is a need for a computer peripheral device mounting arrangement that overcomes the concerns raised by prior mounting arrangements and allows a drive to be mounted from the top and/or the front, requires very minimal disassembly, is compatible with standard half high devices, is easily manufacturable and low cost, readily assembled, meets computer peripheral device shock and vibration requirements, and uses a minimal number of screws.

These and other needs are met by embodiments of the present invention that provide a computer peripheral device mounting arrangement comprising a pair of computer peripheral device mounts. Each computer peripheral device mount includes a computer peripheral device side bracket mountable on an exterior sidewall of the computer peripheral device. Each computer peripheral device mount also includes a drive bay bracket in a drive bay. Additionally, a non-locking securement arrangement is provided on the computer peripheral device side bracket and the drive bay bracket that non-lockingly secures the computer peripheral device side bracket to the drive bay bracket. The computer peripheral device mount also includes only a single locking element that locks the computer peripheral device side bracket to the drive bay bracket and prevents relative movement therebetween.

The mounting arrangement of the present invention thus provides for configuration that allows the computer peripheral device to be non-lockingly secured and then locked with only a single locking element, such as a screw, at each computer peripheral device mount. The arrangement thus satisfies all the needs without requiring more than a single locking element for each computer peripheral device mount of a pair of computer peripheral device mounts. This reduces installation costs while still providing secure mounting of the computer peripheral device within a drive bay.

The earlier stated needs are also met by embodiments of the present invention that provide a method of mounting a computer peripheral device within a drive bay. This method comprises the steps of providing a pair of drive bay brackets in a drive bay, and attaching a pair of computer peripheral device side brackets to a computer peripheral device. The computer peripheral device and computer peripheral device side brackets are positioned between the drive bay brackets. Each one of the computer peripheral device side brackets is non-lockingly secured to a respective one of the drive bay brackets. Each one of the computer peripheral device side brackets is locked to the respective one of the drive bay brackets with only a single locking element.

The earlier stated needs are also met by further aspects of the present invention which provide a computer peripheral device mounting arrangement comprising drive bay brackets in a drive bay, and means for mounting a computer peripheral device to the drive bay brackets.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 3 shows an exploded view of a computer peripheral device and computer peripheral device side brackets prior to attachment of the computer peripheral device side brackets to the sides of a computer peripheral device, in accordance with certain embodiments of the present invention.

DETAILED DESCRIPTION

The present invention addresses and solves problems related to the mounting of computer peripheral devices within the drive bay of an enclosure, and more particularly, to the securing of the computer peripheral device in a manner that meets computer peripheral device shock and vibration requirements but employs relatively few screws. The present invention achieves this, in part, by providing a computer peripheral device mounting arrangement employing a pair of computer peripheral device mounts. Each computer peripheral device mount includes a computer peripheral device side bracket that is mounted to an exterior side wall of the computer peripheral device, and a drive bay bracket that is provided in a drive bay. A non-locking securement arrangement is provided on the computer peripheral device side bracket and the drive bay bracket. This arrangement non-lockingly secures the computer peripheral device side bracket to the drive bay bracket. Once held in place by the non-locking securement arrangement, only a single locking element per computer peripheral device mount is used to lock the computer peripheral device side bracket to the drive bay bracket and prevent relative movement therebetween. The use of only a single locking element, such as a screw, reduces the tooling and hardware required, while the overall arrangement is easily assembled and low cost. In addition, the arrangement is compatible with different configurations, including standard 5.25" half-high or full-high devices, and allows the drive to be mounted from the top and/or the front. Further, the arrangement allows for very minimal disassembly other than removing the top cover to install or swap drives.

FIGS. 1A, 1B and FIGS. 2A, 2B show the brackets that comprise the computer peripheral device mounting arrangement, in accordance with embodiments of the present invention. Brackets are depicted in isolation in FIGS. 1A, 1B and 2A, 2B for ease of illustration and understanding. FIGS. 3-6 depict an exemplary method of mounting a computer peripheral device to the drive bay in accordance with embodiments of the present invention, employing the computer peripheral device mounting arrangement of FIGS. 1A, 1B and 2A, 2B.

Figure 1A:
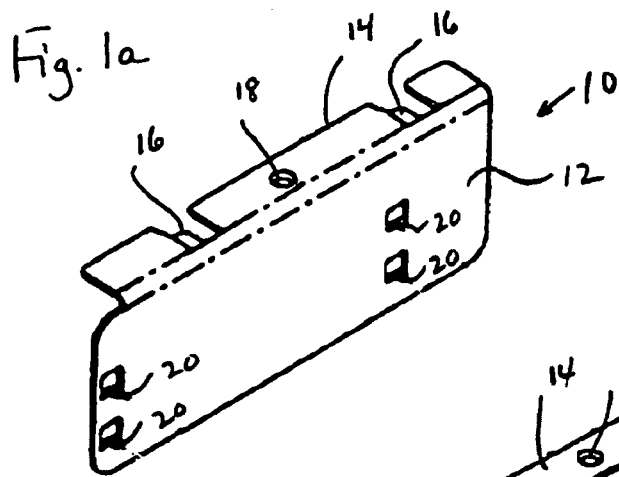
FIG. 1A and FIG. 1B show perspective views of opposite sides, respectively, of left and right computer peripheral device side brackets constructed in accordance with embodiments of the present invention.
Figure 1B:
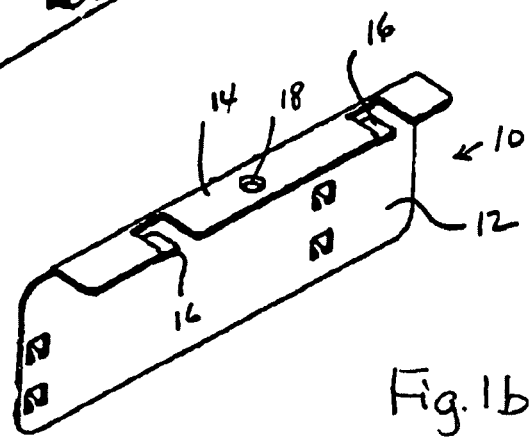

FIGS. 1A and 1B show respective views of opposite sides of left and right computer peripheral device side brackets 10 configured for mounting onto the sidewalls of a computer peripheral device. In exemplary embodiments, the computer peripheral device side brackets 10 are configured for mounting to a conventional 5.25" half-high computer peripheral device. Such drives typically have four screw holes in each of its sidewalls. It is to be clearly understood that the invention is not limited to 5.25" half-high devices, butan be employed with a multitude of different configurations, including but not limited to: 5.25" full-high; double stacked 5.25" half-high; 3.5 " full-high; 3.5 " half-high devices, etc.

The computer peripheral device side brackets 10 are of symmetrical construction, with a left computer peripheral device side bracket 10 and a right computer peripheral device side bracket 10. FIG. 1A shows a left computer peripheral device side bracket 10 and FIG. 1B shows a right computer peripheral device side bracket 10. Since they are of symmetrical construction, they will be described together with like reference numerals.

Each computer peripheral device side bracket 10 of FIGS. 1A and 1B has a vertical panel 12 that is placed against the sidewalls of a computer peripheral device during the mounting process. The vertical panel 12, in preferred embodiments of the invention, is approximately equal to the height of the sidewalls of the computer peripheral device.

Each of the computer peripheral device side brackets 10 includes a perpendicularly extending engagement panel 14 that extends from the top of the vertical panel 12. Each engagement panel 14 includes clips 16 that extend below the plane of the computer peripheral device side bracket engagement panel 14. These clips 16 form part of a non-locking securement arrangement, as will be described later. The engagement panel 14 also includes a screw hole 18 for receiving a screw, such as a self-locating screw, during the mounting process.

Extending from the vertical panel 12 are a plurality of tabs 20. These tabs 20 extend perpendicularly from the vertical panel in a direction opposite to that of the engagement panel 14. Hence, only FIG. 1A clearly shows the tabs 20. These tabs 20 are configured with a size to fit into the screw holes on a standard half high device with enough interference to retain the computer peripheral device side brackets 10 on the computer peripheral device. At the same time, although retaining the brackets 10, the tabs 20 are configured of a size that does not destroy the threads of the screw holes of the computer peripheral device.

Figure 2A:
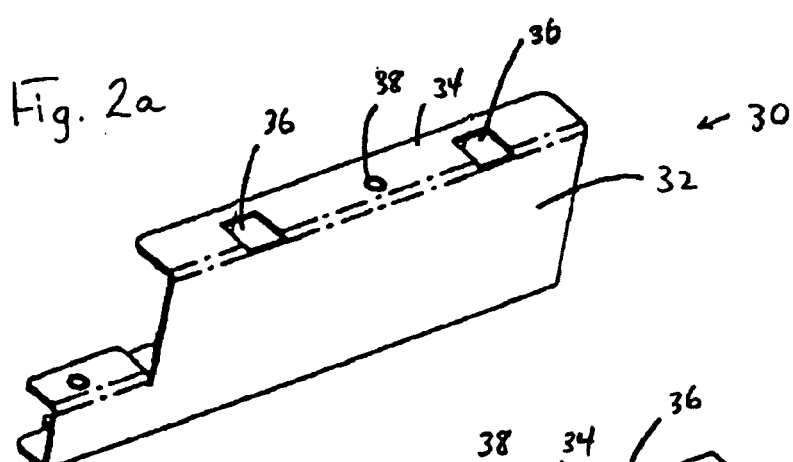
FIG. 2A and FIG. 2B depict perspective views of opposite sides of left and right drive bay brackets constructed in accordance with certain embodiments of the present invention.
Figure 2B:
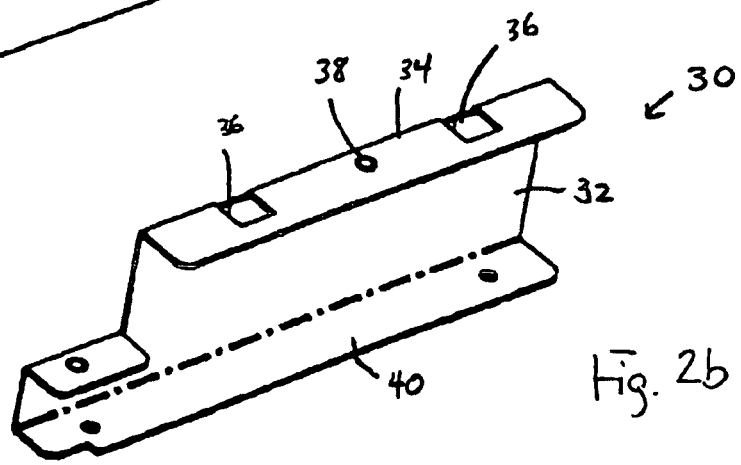

FIG. 2A shows the left drive bay bracket in a perspective view, and FIG. 2B shows the right side drive bay bracket 30 in a perspective view. Opposite sides of these two drive bay brackets 30 are depicted in order to provide a complete understanding of their symmetrical design. These brackets 30 are depicted in isolation, but in certain embodiments of the invention, the brackets 30 are formed integrally with the drive bay rack. In other embodiments, the brackets 30 are separate elements that are mounted in the drive bay.

Each drive bay bracket 30 includes a vertical panel 32 of approximately the same height as the vertical panel 12 of the computer peripheral device side brackets 10. Similarly, the drive bay brackets 30 include an engagement panel 34 that extends in a perpendicular direction from the top of the vertical panel 32. Each engagement panel 34 includes a plurality of slots 36 (two such slots in the exemplary embodiment of FIGS. 2A, 2B). The slots 36 are configured to be a size to accommodate the passage of the clips 16 through the slots 36.

Each drive bay bracket 30 also includes a screw hole 38 that will register with screw holes 18 of the computer peripheral device side brackets 10 upon full engagement of the computer peripheral device side brackets 10 with the drive bay brackets 30.

The drive bay brackets 30 each have a drive bay mounting base 40 that is employed to secure the drive bay brackets 30 to the drive bay. The drive bay mounting base 40 extends perpendicularly from the bottom of the vertical panel 32 in the same direction as the engagement panel 34.

FIG. 3 depicts a computer peripheral device 42 and the computer peripheral device side brackets 10 during a first step of the mounting process in accordance with embodiments of the present invention. The computer peripheral device 42 can be any of a number of different devices, including but not limited to: a tape drive, a CD-ROM drive, DVD-ROM drive, Removable HD, ZIP drives, etc.

The computer peripheral device 42 includes a plurality of screw holes 46 formed on the sidewalls 44 of the computer peripheral device 42. Computer peripheral device 42, in the embodiment of FIG. 3, is a conventional 5.25 " half high device, although the invention is not limited to a particular size or type of device. Each sidewall 44 has four screw holes 46 in the exemplary embodiment. A greater or lesser number of screw holes may be formed within the computer peripheral device 42. In such circumstances, the number of tabs 20 on the vertical panels 12 should not exceed the number of screw holes 46 in the sidewalls 44.

During assembly, the computer peripheral device side brackets 10 are pressed against the sidewalls 44 of the computer peripheral device 42. The posts 20 enter into the screw holes 46 with an interference fit that does not damage the threads within the screw holes 46. The vertical panel 12 is preferably placed flush against the sidewall 44 of the computer peripheral device 42. The multiple interference fits between the tabs 20 and screw holes 46 provide for a secure attachment of the computer peripheral device side brackets 10 to the sidewalls 44 of the computer peripheral device 42.

Figure 4:
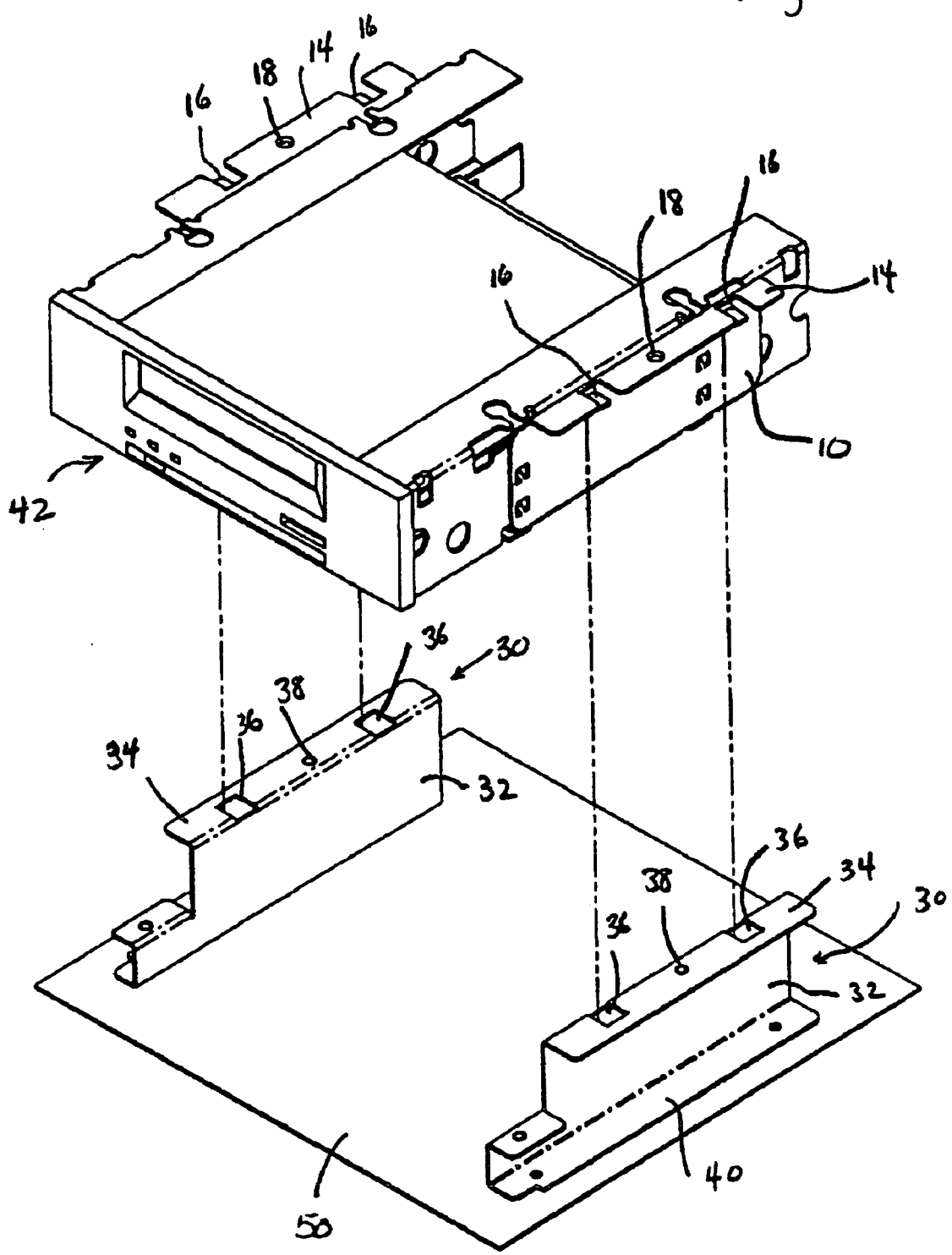
FIG. 4 depicts a computer peripheral device and attached computer peripheral device side brackets prior to vertical insertion in a space between drive bay brackets, in accordance with embodiments of the present invention.

FIG. 4 shows the next step of the mounting process in which the computer peripheral device 42 is placed into the space formed between the drive bay brackets 30. The drive bay brackets 30 are integral to the drive bay 50 in certain preferred embodiments, or have been previously mounted to the drive bay 50 along the drive bay mounting base 40. As seen in FIG. 4, the drive 42 is moved vertically downwardly into the drive bay in the rack mount enclosure. The two clips 16 on each of the engagement panels 14 of the computer peripheral device side brackets 10 pass through the slots 36 in the engagement panels 34 of the drive bay brackets 30. In preferred embodiments of the invention, the drive bay brackets 30 are positioned on the drive bay 50 to provide a slight interference fit when the computer peripheral device 42 and the computer peripheral device side brackets 10 are positioned between the drive bay brackets 30. The slight interference fit serves to restrict movement of the computer peripheral device 42 in the horizontal axis.

Figure 5:
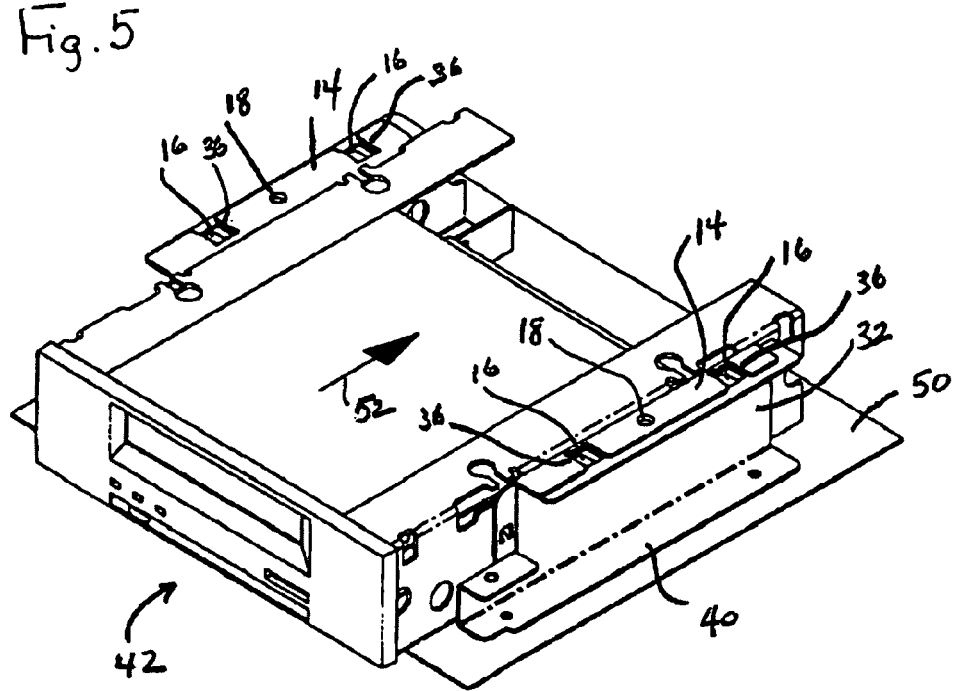
FIG. 5 depicts the mounting arrangement prior to performing a sliding engagement to non-lockingly secure the computer peripheral device side brackets to the drive bay brackets, in accordance with embodiments of the present invention.

FIG. 5 depicts the next step in the mounting process. The computer peripheral device 42, with the attached computer peripheral device side brackets 10, will be slid laterally in the direction of arrow 52. This action causes the clips 16 to engage the slots 36. The computer peripheral device 42 is depicted in the disengaged position in FIG. 5, prior to the lateral movement of the computer peripheral device 42.

Figure 6:
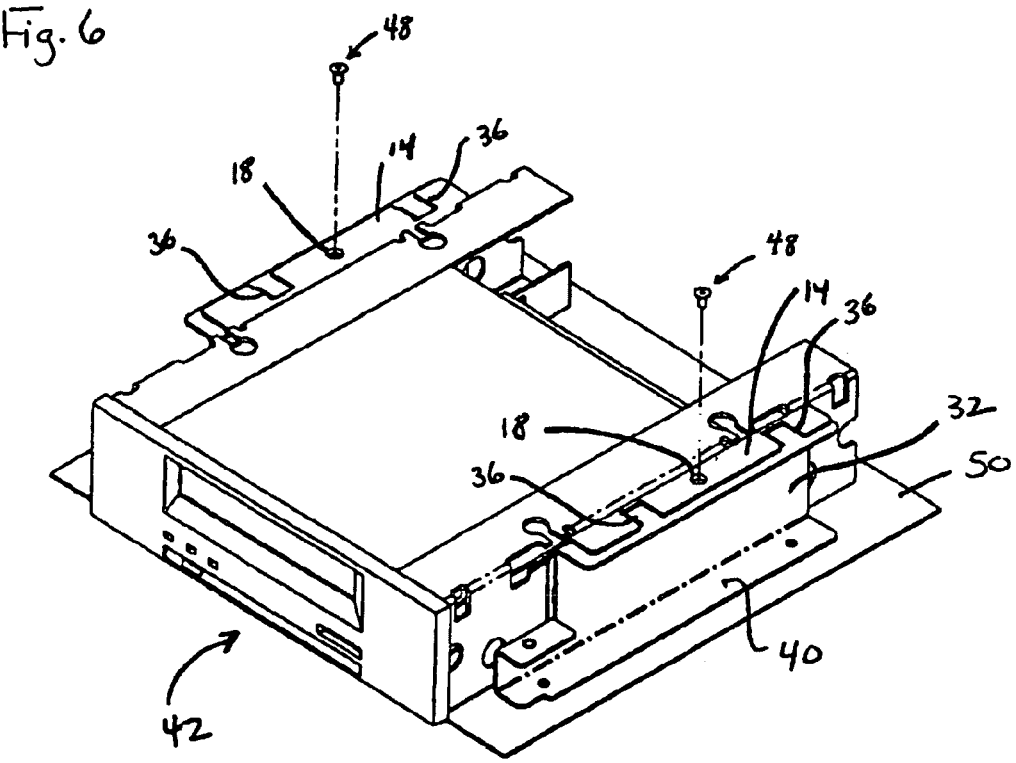
FIG. 6 shows the computer peripheral device mounting arrangement following the non-locking securing of the computer peripheral device side brackets to the drive bay brackets and the registering of the screw holes in the brackets.

The lateral movement of the computer peripheral device 42 and the computer peripheral device side brackets 10 attached to the computer peripheral device 42 results in the position depicted in FIG. 6. The clips 16 have engaged the slots 36 and are no longer visible on FIG. 6. The screw hole 18 in the engagement panel 14 of each computer peripheral device side bracket 10 registers with the screw hole 38 in the engagement panel 34 of each drive bay bracket 30. Hence, only a single locking element 48 each, which in the embodiment of FIG. 6 is a self-locating screw or other type of screw, may be used to engage the screw holes 18 and 38. The screws may be flathead screws, for example. Upon installation, the screws 48 are torqued. The self-locating screws 48 restrict movement in the lateral axis.

Although showing the clip 16 as being on the computer peripheral device side brackets 10, and the slots 36 being on the drive bay brackets 30, this configuration may be reversed so that the slots 36 are formed on the computer peripheral device side brackets 10 and the clips 16 formed on the drive bay brackets 30.

Means for mounting a computer peripheral device to the drive bay brackets include the computer peripheral device side brackets 10, and the single locking element 48 per pair of drive bay bracket 30 and computer peripheral device side bracket 10.

The computer peripheral device mounting arrangement of the present invention thus employs only two screws as locking elements, thereby avoiding use of four or more screws. Hence, the present invention does not increase costs due to added tooling or additional hardware, and avoids the difficulties in accessing a computer peripheral device from the sides. Further, the invention provides enough support to meet shock and vibration requirements of a typical computer peripheral device. The computer peripheral device is relatively easy to mount from the top and/or the front, and requires very minimal disassembly other than removing the top cover to install or swap drives. The computer peripheral device mounting arrangement of the present invention is compatible with standard 5.25" half high devices, or is readily adaptable to other size devices for changing the physical dimensions.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A computer peripheral device mounting arrangement; comprising:
   a) a pair of computer peripheral device mounts, each computer peripheral device mount including:
      i) a computer peripheral device side bracket mountable on an exterior side wall of a computer peripheral device;
      ii) a drive bay bracket fixedly positioned in a drive bay;
      iii) a non-locking securement arrangement on the computer peripheral device side bracket and the drive bay bracket that non-lockingly secures the computer peripheral device side bracket to the drive bay bracket;
   b) only a single first locking element that locks a first of said pair of computer peripheral device side brackets to a first of said pair of drive bay brackets and prevents relative movement therebetween;
   c) only a single second locking element that locks a second of said pair of computer peripheral device side brackets to a second of said pair of drive bay brackets and prevents relative movement therebetween; and
   d) wherein the non-locking securement arrangement is provided by the drive bay bracket further including an engagement panel extending perpendicularly from a drive bay bracket vertical panel, and the computer peripheral device side bracket further including an engagement panel extending perpendicularly from a computer peripheral device side bracket vertical panel, and at least one clip being provided on one of the drive bay bracket engagement panel and the computer peripheral device bracket engagement panel and at least one slot being provided on the other of the drive bay bracket engagement panel and the computer peripheral device bracket engagement panel, the at least one slot and the at least one clip positioned to provide the non-locking securement by engagement of the clip sliding into the slot upon sliding of the computer peripheral device bay bracket relative to the drive bay bracket.

2. The computer peripheral device mounting arrangement of claim 1, wherein the single first locking element is a single screw.

3. The computer peripheral device mounting arrangement of claim 2, wherein the screw is a self-locating screw.

4. The computer peripheral device mounting arrangement of claim 3, wherein the computer peripheral device side bracket includes a plurality of tabs extending perpendicularly from the computer peripheral device side bracket vertical panel.

5. The computer peripheral device mounting arrangement of claim 4, wherein the tabs are configured to attach the computer peripheral device side bracket to the computer peripheral device by interference fit of the plurality of tabs into screw holes in the computer peripheral device.

6. The computer peripheral device mounting arrangement of claim 1, further comprising a screw hole in each of the computer peripheral device bracket engagement panel and the drive bay bracket engagement panel, the screw holes registering upon full engagement of the clip with the slot, the screw holes configured for receiving a screw.

7. The computer peripheral device mounting arrangement of claim 1, wherein the clip and the slot are configured for sliding engagement.

8. The computer peripheral device mounting arrangement of claim 1, further comprising a screw hole in each of the computer peripheral device bracket engagement panel and the drive bay bracket engagement panel, the screw holes registering upon full engagement of the clip with the slot, the screw holes configured for receiving a screw.

9. A method of mounting a computer peripheral device within a drive bay, comprising the steps:
providing a pair of drive bay brackets in a drive bay;
attaching a pair of computer peripheral device side brackets to a computer peripheral device;
positioning the computer peripheral device and computer peripheral device side brackets between the drive bay brackets;
non-lockingly securing each one of the computer peripheral device side brackets to a respective one of the drive bay brackets;
locking each one of the computer peripheral device side brackets to the respective one of the drive bay brackets with only a single locking element; and
wherein non-lockingly securing is accomplished by the drive bay bracket including an engagement panel extending perpendicularly from a drive bay bracket vertical panel, the computer peripheral device side bracket including an engagement panel extending perpendicularly from a computer peripheral device side bracket vertical panel, and providing at least one clip on one of the drive bay bracket engagement panel and the computer peripheral device bracket engagement panel and providing at least one slot on the other of the drive bay bracket engagement panel and the computer peripheral device bracket engagement panel, the at least one slot and the at least one clip positioned to provide the non-locking securement by engagement of the clip sliding into the slot upon sliding of the computer peripheral device bay bracket relative to the drive bay bracket.

10. The method of claim 9, wherein the step of locking includes registering a screw hole in each one of the computer peripheral device side brackets to a screw hole in the respective one of the drive bay brackets and screwing a screw into the registered screw holes, each screw forming a respective one of the single locking elements.

11. The method of claim 10, wherein the step of attaching the pair of computer peripheral device side brackets to the computer peripheral device includes pushing tabs extending from the computer peripheral device side brackets into screw holes in a computer peripheral device side, the tabs fitting into the screw holes with an interference fit that secures the computer peripheral device side brackets to the computer peripheral device.

12. The method of claim 11, wherein the step of providing the pair of drive bay brackets in the drive bay includes fixedly mounting the pair of drive bay brackets to the drive bay with a space between the pair of drive bay brackets that accommodates the computer peripheral device and the attached pair of computer peripheral device side brackets with an interference fit.

13. The method of claim 12, wherein the step of positioning the computer peripheral device and the pair of computer peripheral device side brackets includes moving the computer peripheral device and the attached pair of computer peripheral device side brackets in a vertical direction into the space between the pair of drive bay brackets.

14. A computer peripheral device mounting arrangement comprising:
a) a first computer peripheral device side bracket mountable on a first exterior side wall of a computer peripheral device;
b) a first drive bay bracket fixedly positioned in a drive bay;
c) a first non-locking securement arrangement on said first computer peripheral device side bracket and said first drive bay bracket that non-lockingly secures said first computer peripheral device side bracket to said first drive bay bracket;
d) only a single first locking element that locks said first computer peripheral device side bracket to said first drive bay bracket and prevents relative movement therebetween;
e) a second computer peripheral device side bracket mountable on a second exterior side wall of the computer peripheral device;
f) a second drive bay bracket fixedly positioned in the drive bay;
g) a second non-locking securement arrangement on said second computer peripheral device side bracket and said second drive bay bracket that non-lockingly secures said second computer peripheral device side bracket to said second drive bay bracket;
h) only a single second locking element that locks said second computer peripheral device side bracket to said second drive bay bracket and prevents relative movement therebetween; and
i) wherein the first and second non-locking current arrangements are provided by the first drive bay bracket further including an engagement panel extending perpendicularly from a drive bay bracket vertical panel, and the first computer peripheral device side bracket further including an engagement panel extending perpendicularly from a computer peripheral device side bracket vertical panel, and at least one clip being provided on one of the drive bay bracket engagement panel and the computer peripheral device bracket engagement panel and at least one slot being provided on the other of the drive bay bracket engagement panel and the computer peripheral device bracket engagement panel, the at least one slot and the at least one clip positioned to provide the non-locking securement by engagement of the clip sliding into the slot upon sliding of the computer peripheral device bay bracket relative to the drive bay bracket.

15. The computer peripheral device mounting arrangement of claim 14, wherein the single first locking element is a single screw.

16. The computer peripheral device mounting arrangement of claim 15, wherein the screw is a self-locating screw.

17. The computer-peripheral device mounting arrangement of claim 16, wherein the first and second computer peripheral device side brackets include a plurality of tabs extending perpendicularly from the computer peripheral device side bracket vertical panel and a second computer peripheral device side bracket vertical panel of the second computer peripheral device side bracket.

18. The computer peripheral device mounting arrangement of claim 17, wherein the tabs are configured to attach the first and second computer peripheral device side bracket to a computer peripheral device by interference fit of the tabs into screw holes in the computer peripheral device.

* * * * *

UNITED STATES PATENT AND TRADEMARK OFFICE
CERTIFICATE OF CORRECTION

| | | |
|---|---|---|
| PATENT NO. | : 7,394,651 B2 | Page 1 of 1 |
| APPLICATION NO. | : 11/316049 | |
| DATED | : July 1, 2008 | |
| INVENTOR(S) | : Douglas Alan Green et al. | |

It is certified that error appears in the above-identified patent and that said Letters Patent is hereby corrected as shown below:

Title Pg, Item (73) Assignee: delete "Quantum Corporation" and insert --Certance LLC--.

Signed and Sealed this

Thirty-first Day of March, 2009

JOHN DOLL
*Acting Director of the United States Patent and Trademark Office*